July 16, 1935. E. A. ROCKWELL 2,008,403
DECELERATOR
Original Filed March 3, 1924 4 Sheets-Sheet 3
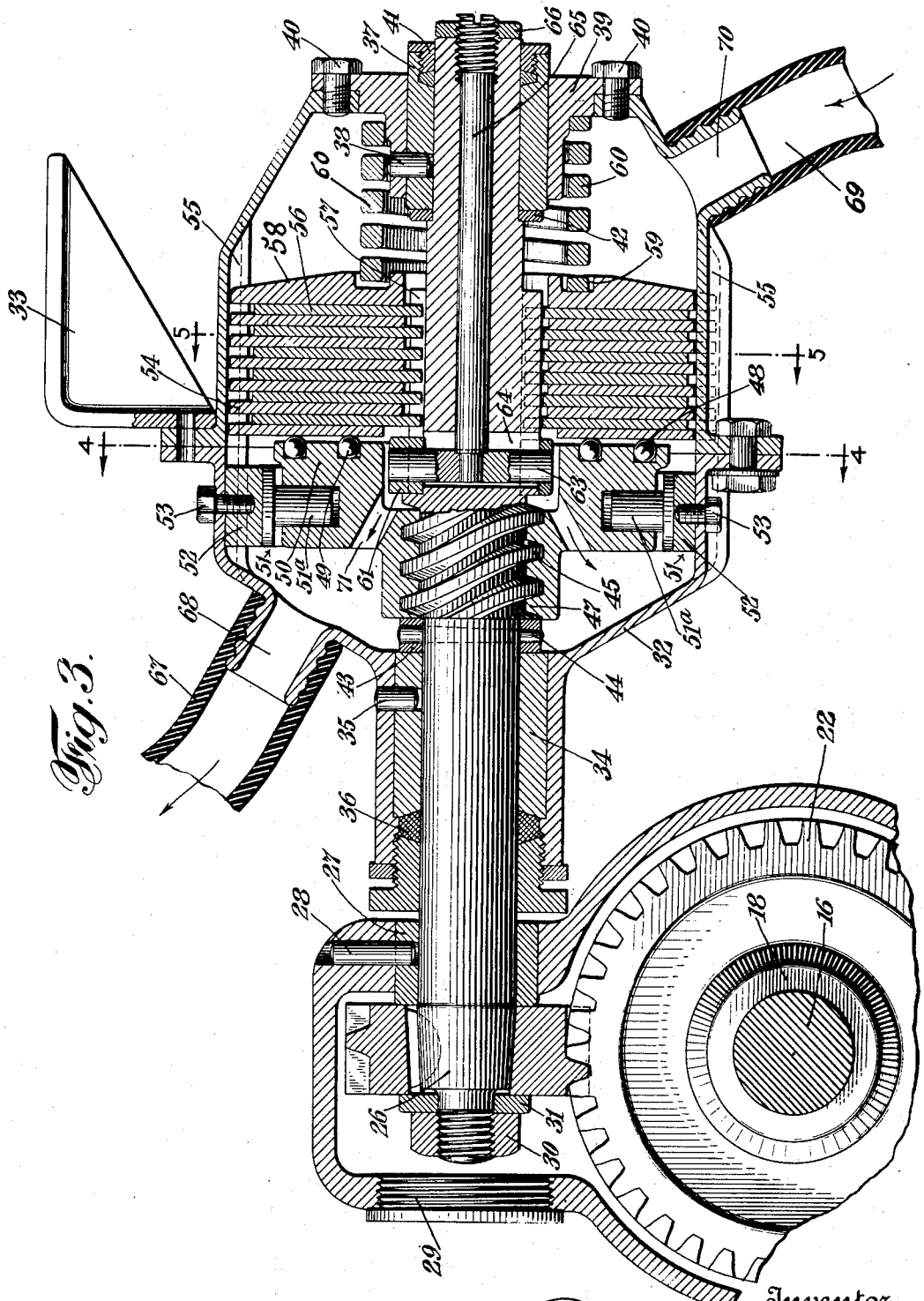

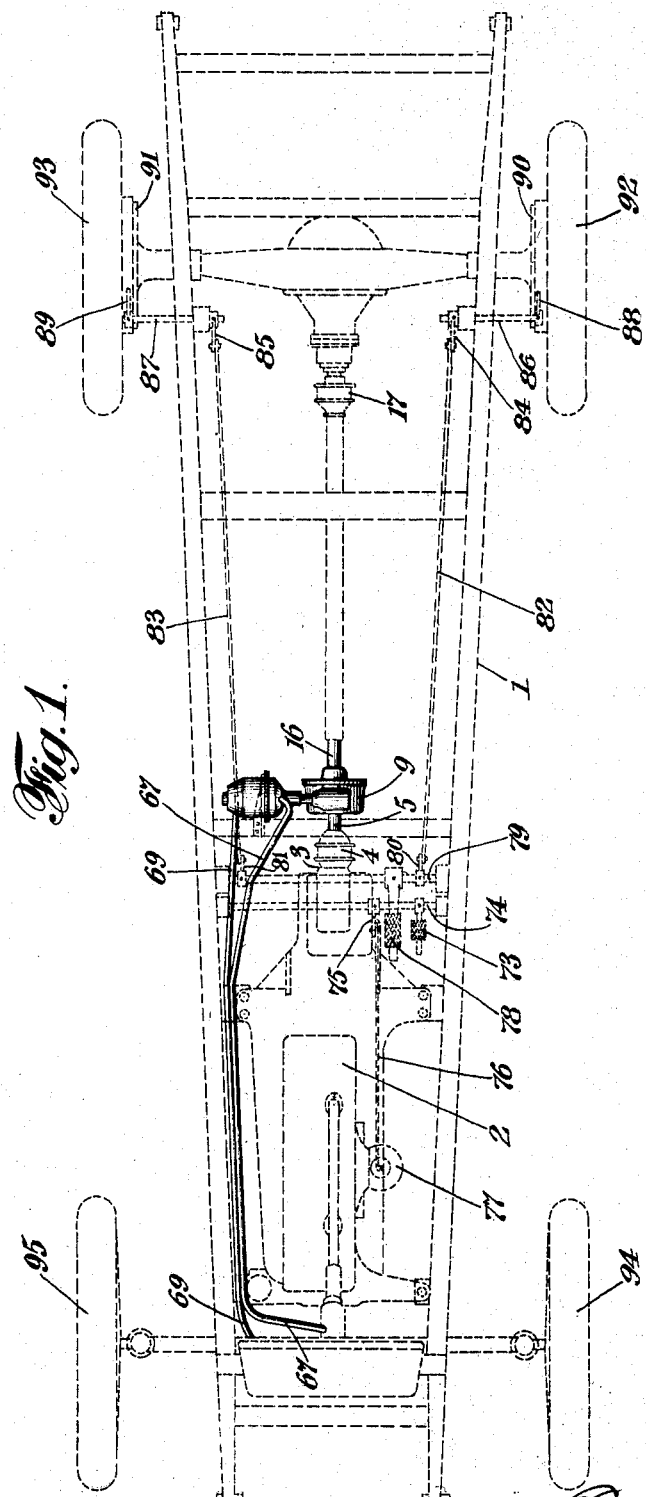

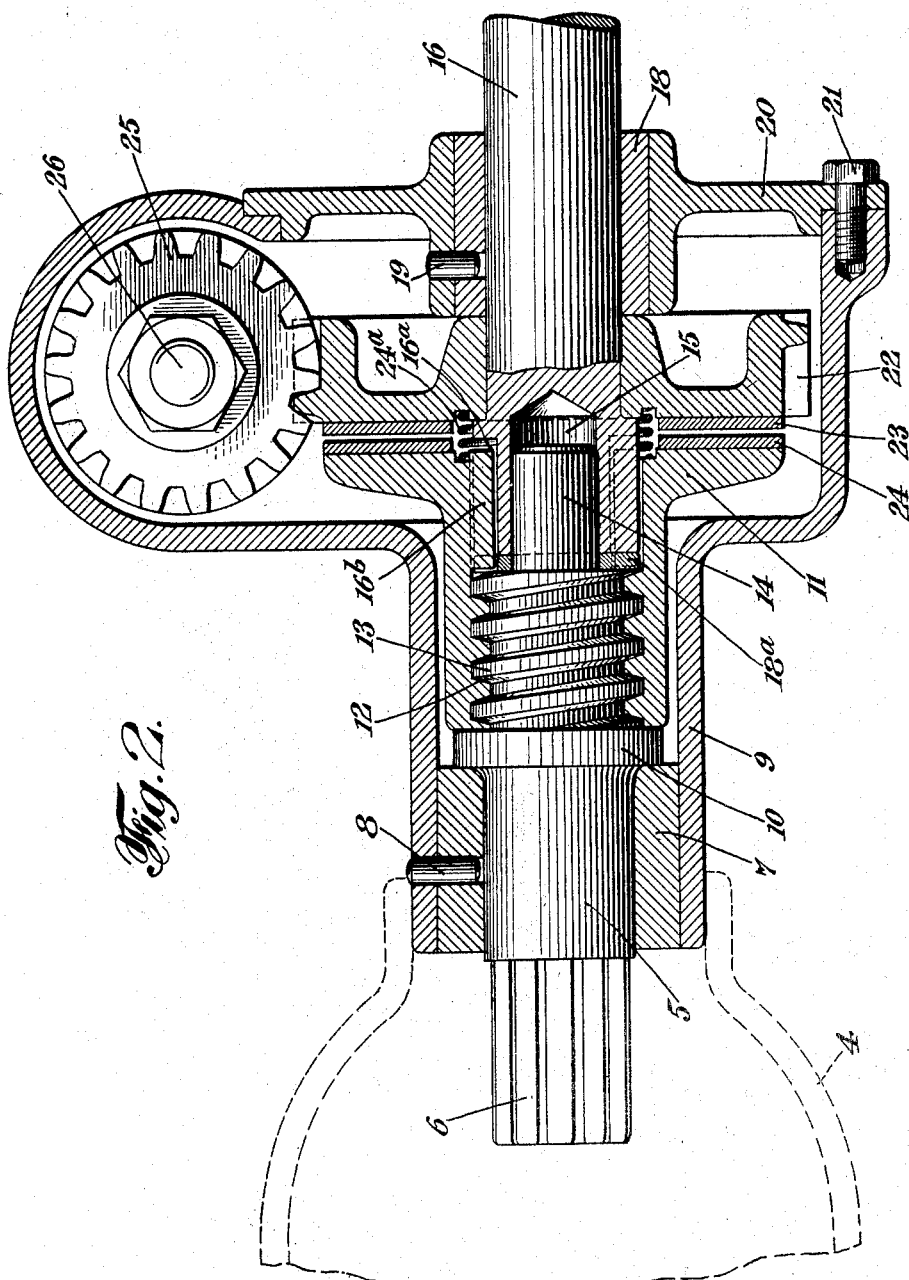

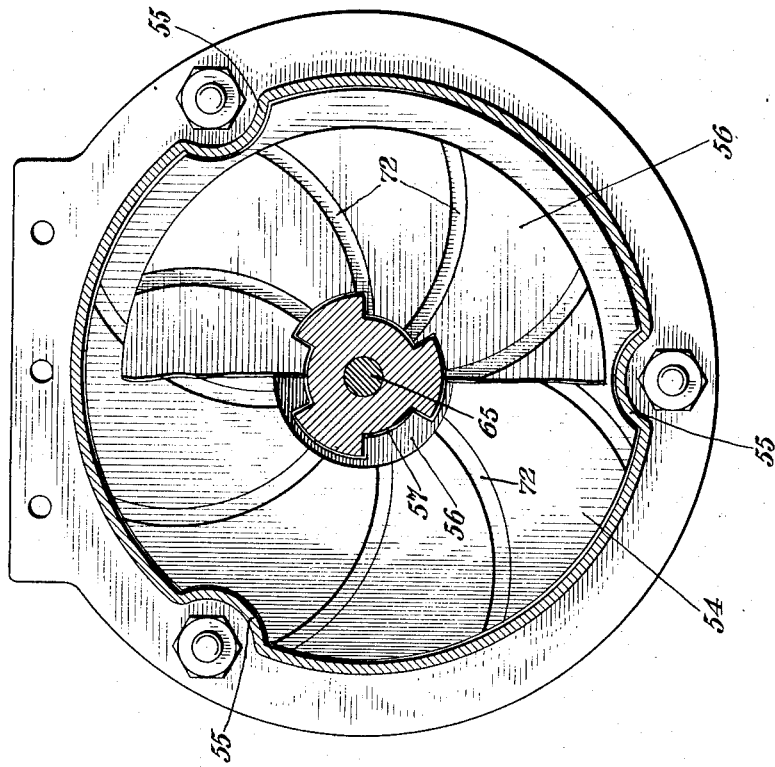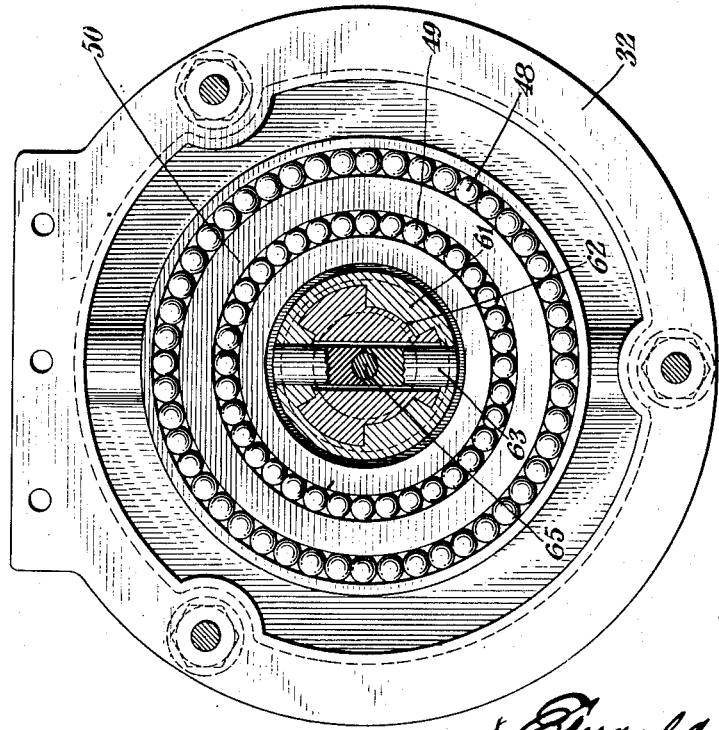

Patented July 16, 1935

2,008,403

UNITED STATES PATENT OFFICE 2,008,403

DECELERATOR

Edward A. Rockwell, Chicago, Ill.

Refiled for abandoned application Serial No. 696,495, March 3, 1924. This application February 24, 1928, Serial No. 256,745. Renewed November 18, 1933.

22 Claims. (Cl. 188—134)

My invention relates to a system by means of which a brake may be applied in an advantageous manner to any mechanism but which is especially adapted for use in connection with automobiles.

The object of my invention is to provide a system of braking which has many advantages and which may be applied to any moving part of any kind of mechanism but which is especially useful in connection with automobiles.

An object of my invention is to provide a braking effect which is brought into play by any condition occurring in the mechanism causing the driven portion of the same to exceed the speed of the driving element therein. In connection with automobiles the purpose is to supply a braking effect when the automobile tends to run faster than the engine or when the engine is caused to run more slowly than the automobile. This is accomplished by putting a load upon the driven shaft when the same is over-running, which may be accomplished through any desired mechanism whether mechanical, electrical, etc. In other words, for example, when it is desired to stop the car the moving of the accelerator lever back to normal position, resulting in the slowing down of the engine, will bring the braking device into action so as to thus automatically retard the car. This braking device may be used in connection with or in the absence of any of the usual braking devices found upon automobiles, as for example, with either rear or front wheel brakes, or even with rear and front wheel brakes or alone without either rear or front wheel brakes. When used with rear wheel brakes the combined braking effect of the braking device made in accordance with my invention and the rear wheel brakes will bring the car to rest more quickly than merely when rear and front wheel brakes are carried by the car. Furthermore, the braking action will come into play more quickly with my device than is possible with either the rear or front wheel brakes used upon automobiles. It has the further advantage that when used with merely rear wheel brakes a better braking effect is obtained than when using merely rear and front wheel brakes but without the disadvantage of front wheel skidding. The tendency to skid when using front wheel brakes is, furthermore, avoided by avoiding any possibility of preventing the rotation of the front wheels. Furthermore, the disadvantage in the use of rear and front wheel brakes due to the difference in wear upon the brake bands thereof, is thus avoided. For these reasons the length of life of the other brakes on the car is increased also. In this way the maximum braking effect is obtained while at the same time the car is kept under control at all times.

However, the apparatus made in accordance with my invention may be so arranged, if desired, that it does not put any more load on the driven shaft than the engine does. Furthermore, the braking device is arranged to become effective gradually and in addition, the braking device, when brought into play, starts without a load, for the same reason and to avoid skidding. Another advantage of the system is that when going into reverse the braking device is automatically disengaged. Again, the parts are arranged so as to operate in a uniform manner by being maintained at an even temperature due to the circulation of a liquid around the same. It will, furthermore, be understood that the braking device may be made of any desired size according to the speed at which it is required to run. The higher the speed of the device the smaller will be the unit required for giving the desired braking effect. Cooling devices are furthermore provided to permit not only large but small units to be used for this purpose when desired.

Further objects of my invention will appear from the detailed description thereof contained hereinafter.

While my invention is capable of embodiment in many different forms for the purpose of illustration I have shown one form in the accompanying drawings in which—

Fig. 1 is a diagrammatic plan view of a chassis of an automobile equipped with my invention.

Fig. 2 is an enlarged longitudinal section of the driven shaft.

Fig. 3 is a vertical section showing the braking devices which are controlled by the driven shaft.

Fig. 4 is a vertical section taken on line 4—4 of Fig. 3 and

Fig. 5 is another vertical section taken on line 5—5 of Fig. 3.

In the drawings I have shown an automobile chassis 1 having an engine 2 mounted thereon. The engine 2 has a driving shaft 3 connected by a universal 4 to a forward driven shaft 5 by means of a series of splines 6 on the front end of the shaft 5. The shaft 5 is carried by a journal 7 held in place by means of a pin 8 in a housing 9. Said shaft 5 has a flange 10 which acts as an abutment for receiving a movable sleeve, 11. The sleeve 11 has an internal screw-thread 12 meshing with a screw-thread 13 upon the shaft 5, the shaft 5 being provided with a rearwardly directed extension 14 rotatably carried within a recess 15 in a rear driven transmission shaft 16. Said shaft 16, furthermore, has at its forward end a series of grooves 16a to receive corresponding inwardly directed projections 16b upon the sleeve 11. Between the shaft 16 and shaft 5 there is a thrust washer 18a having peripheral notches to permit the same to be slipped inside of the sleeve 11. It will be understood that the shaft 16 is connected with a rear universal 17 through which the car is driven. Furthermore, the forward end of the shaft 16 is supported in a journal-bearing 18 held in place by a pin 19, the same being supported by a cover 20 connected by screws 21 to the housing 9. Between the bearing 18 and the rearward end of the sleeve 11 there is a worm 22 having a friction clutch surface 23 arranged to co-operate with a friction clutch surface 24 carried by the sleeve 11. These two surfaces 23 and 24 are normally spaced apart at an appreciable distance owing to the position of the sleeve 11 which is determined by contact with the abutment 10 and there is a spring 24a located between the sleeve 11 and worm 22. When, for any reason, the shaft 16 over-runs, the shaft 5, thus, will cause the sleeve 11 to be moved by the screw-thread 12 rearwardly so as to bring the clutch surfaces 23 and 24 into contact, thus rotating the worm 22 with the shaft 16. This will result in the rotation of a worm 25 meshing with the worm 22 loosely mounted on the shaft 16, but normally held stationary.

The worm 25 is located upon a shaft 26 supported at one end in a journal-bearing 27 held in place by a pin 28 in the housing 9. A screw-cover 29 is located at this end of the shaft 26 to permit access to a nut 30 which, by means of a washer 31, holds the worm 25 in place. The other end of the shaft 26 is carried in a brake-casing 32 loosely supported by a bracket 33 which is secured to the chassis 1. At one end of the casing 32 there is a bearing 34 held in place by a pin 35 to support the shaft 26, a stuffing box 36 being provided at this point to prevent the leakage of water. At the other end the shaft 26 is carried in a bearing 37 held in place by a pin 38 located in a removable cover 39 secured to the casing 32 by screws 40, a stuffing box 41 being provided at this end of the shaft also. A thrust-washer 42 supports the shaft against the bearing 37 at one end and a thrust-washer 43, having a pin 44 passing through the same, supports the shaft 26 from the opposite direction. Adjacent to the thrust-washer 43 there is a screw-thread 45 on the shaft 26 which cooperates with an internal screw-threaded sleeve 47 having ball-bearings 48 and 49 carried in a flange 50 thereon. The flange 50 is arranged to receive a drag at 51 through means of a series of centrifugal plungers 51a provided with braking surfaces adjacent to the inner surface of a ring 52 held in the casing 32 by screws 53. The contact of the plungers 51a with the ring 52 serves to retard the rotation of the member 47 and consequently causes it to be moved axially along the shaft 26 by means of the threads 45. The purpose of the ball-bearings 48, 49 is to contact with one of a series of brake-discs 54 splined within the casing 32 and which cooperate with a series of splines 55 upon the interior of the casing 32. Alternating with the discs 54 there is a set of similar discs 56 splined to the shaft 26 by means of splines 57 thereon. An end disc 58 is provided adjacent the last one of the discs 56, the same being provided with a groove 59 to receive a spring 60, the other end of which rests against the interior of the cover 39.

In order to adjust the braking effect by controlling the degree of pressure obtainable between the discs 54 and 56 I have provided a collar 61 on the shaft 26 and which is provided with interior notches or recesses 62 fitting between the splines 57. A pin 63 holds the collar 61 in place by passing through the same, said pin being located in a slot 64 in the shaft 26 and being arranged to be adjusted longitudinally by a rod 65 screw-threaded in a longitudinal recess provided in the center of the shaft 26. A nut 66 secures the rod 65 in its adjusted position. The collar 61 serves to limit the movement of the disks 54 and 55 under pressure from the spring 60 and further serves to limit the movement of the threaded sleeve 47. The position of the collar 61 is adjusted by means of the rod 65 which thus controls the adjustment of the braking effect.

In order to keep the braking device at an even temperature and thus provide an even braking effect, circulation of water may be provided by means of a tube 67 leading from the upper portion of the water circulating system of the engine 2 to a port 68 in the upper portion of the casing 32 and a tube 69 is provided leading to a port 70 in the lower portion of the casing 32. It will be noted that the ports 68 and 70 are located, furthermore, at the two ends of the casing 32 and that the sleeve 47 has a number of radial ports 71 to cause the circulation through the same of the water in the direction of the arrows. If desired, each of the discs 54 and 56 may be provided with circular grooves 72 to assist in cooling the same. The disks 54 and 56 and the sleeve 47 thus serve as a pump to circulate water through the brake and the connecting tubes 67 and 69 carry it to and from the radiator where the water is cooled.

Furthermore, there may be provided on the automobile an accelerating and braking means in addition, as desired. For this purpose there may be provided an accelerator lever 73 carried by a shaft 74 journaled in the frame 1 and carrying a lever 75 connected by a rod 76 to a throttle-valve 77 of the usual type. Again, the automobile may be provided with a foot lever 78 for braking, carried upon a shaft 79 journaled in the frame 1 and provided with levers 80 and 81 for operating rods or cables 82 and 83 connected respectively at their other ends to levers 84 and 85 on shafts 86 and 87 journalled in the frame 1 and provided with levers 88 and 89 for operating band-brakes 90 and 91 on rear wheels 92 and 93 carried by the chassis.

In the operating of my braking device it is to be understood that when, for any reason, the car is moving faster than the engine or the engine is caused to move more slowly than the car as, for instance, when the volume of the fuel fed to the engine is decreased by the driver of the car lifting his foot from the accelerator lever 73 partly or entirely, this will have the effect of bringing the braking device into action if the lifting of the foot is not too slow, owing to the consequent rotation of the sleeve 11 relative to shaft 5 and the resulting contact between the clutch surfaces 23 and 24. However, it will be understood that it will take an appreciable effect to bring the clutch surfaces 23 and 24 together owing to the presence of the spring 24a. In this way, for example, the braking device will not be brought into operation merely by such an operation as the shifting of the gears in the normal intervals between succeeding positions in gear shifting, that is to say, while the engine clutch is thrown out. As a result of the engagement of the clutch surfaces the shaft 26 will be rotated and, accordingly, due to the retardation afforded by the presence of the plungers 51a, the flange 50 will move the brake discs 54 and 56 together to the degree permitted by the position of the adjusting rod 65 and the braking effect will thus be applied to the car. This action will take place when the control is moved to decrease the acceleration applied to the car through the accelerator lever. It will also occur when the car is coasting down a hill. In general it will occur when it is desired to retard the movement of the car and this will occur before the operator of the car will have had time to apply the wheel brakes by the movement of any brake lever with which the car is equipped. The car will, therefore, be retarded in a most effective manner in that the braking action takes place before any opportunity has been available for the application of the usual brakes carried by the wheels of the automobile. It will also be understood that the regulation of the braking effect at any time, is determined by the amount of the drag produced by the engine running at a relatively lower speed than the automobile and that, therefore, the control of the speed of the engine will control the braking effect through the said drag of the engine. For example, in descending a hill there would be a nice point found in the regulation of the braking effect due to the application of the drag of the engine as referred to. The car being equipped with an additional brake to be operated by the brake lever 78, it will be understood that this brake 78 may be used as an emergency brake or a brake of the ordinary type but that by reason of the presence of the automatic brake described in detail herein the movement of the car will already be slowed down by the braking system before the operator has had time to place his foot on the brake lever 78. In other words, the normal braking action as applied to a car will have been brought into operation before the foot has left the accelerator lever 73 instead of thereafter as is ordinarily the case with other types of braking mechanism. For these reasons, furthermore, the brake which is operated by the lever 78 and which may be an emergency brake, will be brought into action as an emergency brake when desired as a final braking operation before this would have been possible with the ordinary braking systems previously used. When the differential speeds between the driving and driven parts have ceased to cause the screw 45 to move the flange 50 so as to produce a braking effect between the discs 56 and 54, the force of the spring 60 will cause the flange 50 to be returned to its initial position owing to the energy that has been stored up in the spring 60 by the compression of the same.
This movement is possible due to the fact that at the lower speeds the centrifugal plungers 51 will exercise less friction against the ring 52 than in the case where the brake-discs 54 and 56 are being brought into action. Since the screw thread 13 on the shaft 5 and the meshing thread 12 on the sleeve 11 serve to operate to move the sleeve 11 only when the shafts are rotating in one direction, it will be apparent that there will be no braking effect on rearward movement of the car. The reverse movement of the shaft 5 will cause the sleeve 11 to move toward the clutch surface 23 on worm 22 which will stop the axial movement of the sleeve and shaft 16 will be driven through the grooves and projections 15a and 16b. The worm 22 will rotate gear 25 and shaft 26 in the reverse direction. This will cause the sleeve 47 in the brake to be held against the thrust collar 43 and there will be no braking action.

Many advantages result from the provision of braking devices in this way as have been referred to in detail hereinabove.

While I have described my invention above in detail I wish it to be understood that many changes may be made therein without departing from the spirit of the same.

I claim:

1. An automobile braking system comprising, a driving means, a braking device and mechanical connections comprising a friction means for bringing the braking device into action by a relative decrease of the speed of the driving means relative to the automobile and a driven means deriving its power directly from the driving means.

2. In a braking system, driving means, a normally stationary member capable of rotation, means for coupling said driving means to said member for rotation therewith, braking means brought into action by the rotation of said member and means controlling the braking pressure by the speed of rotation of said member.

3. In a braking system for automobiles, a drive shaft, a normally stationary counter-shaft, means for coupling said drive shaft to said counter-shaft for rotation thereof, braking means brought into action by the rotation of said counter-shaft and means controlling the braking pressure by the speed of rotation of said counter-shaft.

4. In a braking system, a drive shaft, a normally stationary member capable of rotation, friction clutching means for coupling said drive shaft to said member for rotation thereof, braking means brought into action by the rotation of said member and means controlling the braking pressure by the speed of rotation of said member.

5. In a braking system for automobiles, a drive shaft, a clutch element driven thereby, a normally stationary member capable of rotation, a second clutch element rotatable therewith, means for producing frictional engagement between said clutch elements to produce rotation of said member, braking means brought into action by the rotation of said member and means controlling the braking pressure by the speed of rotation of said member.

6. In a braking system, driving means, a normally stationary member capable of rotation, means for coupling said driving means to said member for rotation thereof, a brake actuating element rotatable with said member and movable longitudinally with respect thereto, braking means brought into action by the longitudinal movement of said brake actuating element and means for producing the longitudinal movement of said brake actuating element and thereby controlling the braking pressure by the speed of rotation of said member.

7. In a braking system, a drive shaft, a normally stationary counter-shaft, means for coupling said countershaft to said drive shaft for rotation thereof, a brake actuating element carried by said counter-shaft for rotation therewith and movable longitudinally with respect thereto, resilient means normally holding said brake actuating element in inoperative position, braking means operable by the longitudinal movement of said brake actuating element against the resistance of said resilient means and frictional retarding means for acting upon said brake actuating element to retard its rotation with respect to said counter-shaft and operable to produce longitudinal movement of said element for applying said braking means upon rotation of said countershaft.

8. In an automobile braking system, a drive shaft, a second shaft normally disconnected from said drive shaft, a brake actuating element impositively rotated by said second shaft, coupling means for connecting said drive shaft to said second shaft and braking means brought into action by a relative rotation between said brake actuating element and said second shaft.

9. In an automobile braking system, a drive shaft, a clutch element spirally threaded thereto, a second clutch element, means for producing a relative rotation between said first clutch element and said drive shaft for causing lateral movement thereof to bring said clutch elements into engagement, a second shaft driven by the rotation of said second clutch element, a brake actuating element spirally threaded to said second shaft, frictional gripping means for retarding the rotation of said brake actuating element with respect to said second shaft to cause lateral movement thereof and braking means for said second shaft operable by a lateral movement of said brake actuating element.

10. In a braking system, a drive shaft, a clutch element spirally threaded thereto, a second normally stationary shaft, a second clutch element connected to drive said second shaft, means for producing frictional engagement between said clutch elements to drive said second shaft, a brake actuating element spirally threaded to said second shaft, resilient means normally holding said brake actuating element in inactive position with respect to said second shaft, braking means for retarding the rotation of said second shaft brought into action by the travel of said brake actuating element along said second shaft against the resistance of said resilient means and frictional gripping means operable upon the rotation of said brake actuating element for retarding the rotation thereof to effectuate its travel in a brake actuating direction whereby the speed of rotation controls the braking pressure.

11. A braking system comprising a driving shaft, a driven shaft, a coupling sleeve between said shafts, said sleeve having a spiral thread connection with said driving shaft and a keyed connection with said driven shaft permitting longitudinal movement of said sleeve upon differential movement between said shafts, a normally stationary sleeve adjacent said coupling sleeve for frictional engagement therewith upon longitudinal movement of said coupling sleeve in one direction and braking means automatically brought into action by the rotation of said normally stationary sleeve upon frictional engagement with said rotatable coupling sleeve.

12. A braking system comprising a driving shaft, a driven shaft, a coupling sleeve between said shafts spirally threaded to said drive shaft and keyed to said driven shaft for longitudinal movement with respect thereto, a normally stationary sleeve mounted adjacent said movable coupling sleeve for frictional engagement therewith upon longitudinal movement of said coupling sleeve, resilient means normally holding said sleeves out of frictional engagement and braking means brought into action by the rotation of said normally stationary sleeve.

13. In a braking system for automobiles comprising a drive shaft connected to the engine, a driven shaft connected to the wheels, a coupling member between said shafts positively rotated with said driven shaft but capable of axial movement with respect thereto, means connecting said coupling member to said drive shaft comprising cam surfaces for producing axial movement of said coupling member when said driven shaft tends to rotate faster than said drive shaft, a normally stationary clutch element adapted to be frictionally engaged by the coupling member upon the axial movement thereof whereby the clutch element is rotated and braking means for the automobile brought into action by the rotation of said clutch element.

14. In a braking system, driving means, a normally stationary member capable of rotation, means for coupling said driving means to said member for rotation thereof, a brake actuating element axially movable with respect to said member and braking means brought into action by the axial movement of said element.

15. In a braking system, driving means, a normally stationary member capable of rotation, means for coupling said driving means to said member for rotation therewith, a slidable thrust member, spiral coupling means between said members whereby said thrust member is moved by the rotation of said normally stationary member and braking means brought into action by the movement of said thrust member.

16. In a braking system, a drive shaft, a normally stationary counter-shaft, means for coupling said drive shaft to said counter-shaft for rotation thereof, a thrust member axially movable with respect to said counter-shaft, spiral coupling means between said thrust member and said counter-shaft whereby said thrust member is moved by the rotation of said counter-shaft and braking means brought into action by the movement of said thrust member.

17. In a braking system, a drive shaft, a normally stationary member capable of rotation, friction clutch means for coupling said drive shaft to said member for rotation thereof, a thrust member axially movable with respect to said first-mentioned member, spiral means coupling said members for moving said thrust member upon rotation of said first-mentioned member and braking means brought into action by the movement of said thrust member.

18. In a braking system, a drive shaft, a clutch element driven thereby, a normally stationary member capable of rotation, having a second clutch element coupled to said normally stationary member, means for producing frictional engagement between said clutch element and second clutch element to produce rotation of said member, a thrust member axially movable with respect to said first-mentioned member, spiral means intermediate said members for producing movement of said thrust member upon rotation of said first-mentioned member and braking means brought into action by the movement of said thrust member.

19. In a vehicle control system, driving means, a normally stationary member capable of rotation, means for coupling said driving means to said member for rotation thereof, a control actuating element axially movable with respect to said member and control means brought into action by the axial movement of said element.

20. In a vehicle control system, a vehicle drive shaft, a clutch element driven thereby, a normally stationary member capable of rotation, having a second clutch element coupled to said normally stationary member, means for producing frictional engagement between said clutch element and said second clutch element to produce rotation of said member, a thrust member axially movable with respect to said first-mentioned member, spiral means intermediate said members for producing movement of said thrust member upon rotation of said first-mentioned member and vehicle control means brought into action by the movement of said thrust member.

21. In a power applying system of an automotive vehicle, driving means, a normally stationary member capable of movement, means for coupling said driving means to said member for continuous movement thereof while coupled, an actuating element for actuating said member movable with respect to said member and energy applying means adapted to be energized by the movement of said element.

22. In a power applying system of an automotive vehicle, means adapted to be moved in the movement of the vehicle, a normally stationary member capable of movement, means for coupling said first mentioned means to said member for continuous movement thereof while coupled, an actuating element for actuating said member movable with respect to said member and energy applying means adapted to be energized by the movement of said element.

EDWARD A. ROCKWELL.